J. C. WOOD.
AMALGAMATOR.
APPLICATION FILED FEB. 19, 1913.

1,133,210.

Patented Mar. 23, 1915.

WITNESSES
E. M. Callaghan
A. L. Kitchin

INVENTOR
JOHN C. WOOD,
BY Munn & Co
ATTORNEYS

UNITED STATES PATENT OFFICE.

JOHN C. WOOD, OF MONERO, NEW MEXICO.

AMALGAMATOR.

1,133,210.  Specification of Letters Patent.  Patented Mar. 23, 1915.

Application filed February 19, 1913. Serial No. 749,346.

*To all whom it may concern:*

Be it known that I, JOHN C. WOOD, a citizen of the United States, and a resident of Monero, in the county of Rio Arriba and State of New Mexico, have invented a new and Improved Amalgamator, of which the following is a full, clear, and exact description.

This invention relates to improvements in amalgamators, and has for an object to provide an improved structure for causing the gold or other mineral matter to be separated while the aggregate matter is moving continually through the device.

Another object of the invention is to provide an amalgamator having adjustable stops whereby the flow of the mineral matter and water through the device may be regulated to agree properly with the various stops and settling parts of the device.

In carrying out the objects of the invention, a pair of troughs are provided, one having an adjustable collecting arrangement, and the other a stirring device and a sieve or collecting screen. As the water and mineral matter are passed into the first trough the various settling devices and stops cause a certain grade of the mineral to remain in the first trough and allow the remaining grades to pass into the second trough where the water and mineral matter is agitated and then allowed to settle as the same passes over a screen which gathers and retains the precious metal.

A practical embodiment of the invention is represented in the accompanying drawings forming a part of this specification, in which similar characters of reference indicate corresponding parts in all the views.

Figure 1:
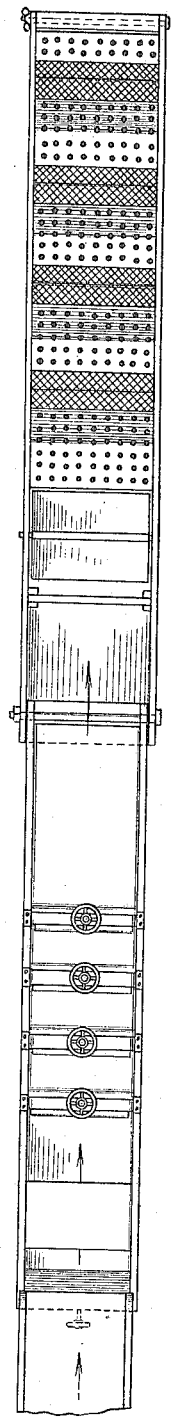
Figure 2:
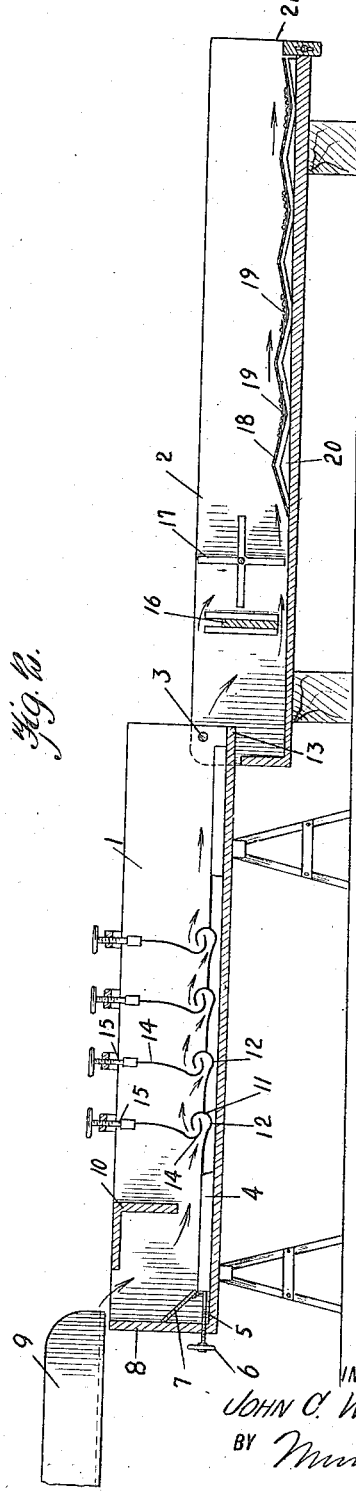

Figure 1 is a top plan view of an embodiment of the invention; and Fig. 2 is a longitudinal vertical section through the construction shown in Fig. 1.

Referring to the accompanying drawings by numerals, 1 and 2 represent a pair of settling troughs connected together by a shaft 3. These troughs are supported by any desired means so that the matter from trough 1 may flow into trough 2 and from thence out the end of trough 2. Arranged in the trough 1 is a sliding member 4 having a threaded shaft 5 extending to the front wall of trough 1 upon which is mounted a threaded nut or wheel 6 which may be operated for moving the member 4 back and forth. The upper end of the member 4 is provided with a baffling plate 7 resting against the end 8 of the trough 1 for directing matter from the supply trough 9 into trough 1. The trough 1 is provided with a stop or baffle 10 for causing the water and mineral matter to pass downward and along the upper surface of the member 4. The member 4 is provided with a plurality of substantially semi-cylindrical cross amalgamating members 11 each having a depressed portion 12 which is adapted to receive the gold or other matter which settles as the same flows along. It will be observed from Fig. 2 that the water and mineral matter must pass through each of the semi-cylindrical members 11 and in doing so passes downward toward the lower end of the trough 1 and then back a short distance. This is repeated as many times as there are semi-cylindrical portions 11 so that all of a certain grade of mineral will be collected before the remaining mineral matter passes out of the lower end 13 of the trough 1. An adjustable curved amalgamating member 14 is provided which assists in directing the flow of water and other matter through the semi-cylindrical members 11. The member 14 is connected with adjustable screws 15 which may be used for raising and lowering the same while the members 5 and 6 are used for moving the member 4 longitudinally. As the matter flows from the trough 1 the same empties into the upper end of trough 2 and passes under and also over a baffling board 16. In addition the matter strikes or engages a baffling wheel 17 which rotates the same whereby the matter is agitated previous to its passage over the perforated plates 18 and the collecting screens 19. The plates 18 are corrugated or formed wavy in cross section, as clearly shown in Fig. 2 and permit the water and fine mineral to pass therethrough into the spaces 20 therebeneath. The wire mesh or collecting screens 19 gather the coarser material and hold the same as the remaining mineral and the water passes out the lower end 21 of trough 2. The troughs 1 and 2 are preferably set at a slight angle so that the water and other matter may readily flow from one end to the other.

In operation the material is thrown into the trough 9 and water is forced therein so that the water and material passes into trough 1 and then into trough 2, and finally out end 21. In its passage through the troughs 1 and 2 the same is agitated and thoroughly mixed, and at the same time given a chance to precipitate the heavy matter therein so that the gold or other mineral may settle at the various points designated.

Having thus described my invention I claim as new and desire to secure by Letters Patent:

1. In a device of the character described, a trough, a plurality of substantially semi-tubular baffling members extending transversely of the trough with their open sides facing the upper end of the trough, said members being longitudinally adjustable in the trough, and vertically adjustable baffle plates having curved lower ends extending into the semi-tubular baffling members.

2. In a device of the character described, a trough adapted to receive matter to be separated, feeding means for said trough, a longitudinally slidable plate arranged in said trough formed with transverse substantially semi-tubular baffling members for receiving a precipitate from the matter fed into the trough, and a baffling plate for each of said semi-baffling members.

3. In a device of the character described, a trough, a longitudinally reciprocating member arranged in the bottom thereof, a plurality of baffling members projecting upwardly from said reciprocating member, means for regulating the position of said reciprocating member, an independent baffling plate for each of said baffling members, and means for adjusting said baffling plates in a direction normal to the direction of movement of said reciprocating member.

4. In a device of the character described, a trough, means for feeding matter into the upper end of said trough, a baffling member arranged near the upper end of said trough, said baffling member being arranged in the upper part of said trough and extending outwardly toward the bottom so as to direct the matter fed into the trough to a position near the bottom thereof, a plurality of baffling members arranged in the bottom of said trough, means for adjusting said baffling members longitudinally of the trough, and adjustable plates arranged in said trough and co-acting with said baffling members for causing the matter passing over said baffling members to move in a tortuous passageway.

5. In a device of the character described, a trough, a plurality of arc-shaped transversely positioned baffles arranged in the bottom of said trough, means for adjusting said baffles longitudinally of the trough, a plurality of plates extending from the upper edge of said trough downwardly to a position in front of said baffles and then toward the discharge end of the trough and into the arc-shaped baffles in said baffles whereby matter passing over the bottom of said trough must move in a tortuous passageway and means for raising and lowering said plate whereby the sides of said tortuous passageway may be varied.

6. In a device of the character described, a trough, a plurality of transversely arranged semi-tubular baffles, means for adjusting said baffles longitudinally of said trough, a sheet metal device extending from near the top of said trough downward to a position in front of each of said baffles and then toward the discharge end of the trough and into the semi-tubular baffles, and means for adjusting vertically said sheet metal device.

7. In a device of the character described, a trough, a transversely arranged baffling member in the bottom of the trough and adjustable longitudinally thereof, means for regulating the position of the said baffling member, a transverse member vertically adjustable and coacting with the first member, and means for regulating the position thereof independent of and in a direction at right angles to the direction of movement of the said first member.

In testimony whereof I have signed my name to this specification in the presence of two subscribing witnesses.

JOHN C. WOOD.

Witnesses:
W. M. MONTGOMERY,
J. M. CLIFFORD.

Copies of this patent may be obtained for five cents each, by addressing the "Commissioner of Patents, Washington, D. C."